United States Patent [19]
Spatafora et al.

[11] Patent Number: 5,823,738
[45] Date of Patent: Oct. 20, 1998

[54] METHOD AND UNIT FOR FORMING STACKS OF ARTICLES

[75] Inventors: Mario Spatafora; Fabrizio Tale', both of Bologna, Italy

[73] Assignee: Azionaria Costruzioni Macchine Automatiche A.C.M.A. S.P.A., Bologna, Italy

[21] Appl. No.: 774,043

[22] Filed: Dec. 27, 1996

[30] Foreign Application Priority Data

Jan. 9, 1996 [IT] Italy .................................. BO96A0011

[51] Int. Cl.⁶ .............................. B65H 29/00; B65G 57/30
[52] U.S. Cl. ...................... 414/795.1; 414/786; 414/789; 414/795; 271/179; 198/625
[58] Field of Search .................................. 414/789, 789.1, 414/795, 795.1, 795.3, 790.3, 786; 198/62.5; 271/179

[56] References Cited

U.S. PATENT DOCUMENTS

| | | | |
|---|---|---|---|
| 2,917,284 | 12/1959 | Christian ................................. | 198/625 |
| 3,063,577 | 11/1962 | Shields . | |
| 3,712,487 | 1/1973 | Eberle . | |
| 4,108,319 | 8/1978 | Kacirek et al. ...................... | 414/795.1 |
| 4,314,785 | 2/1982 | LaFleur, Jr. ............................... | 414/46 |
| 4,378,938 | 4/1983 | Staniszewski ......................... | 414/795.1 |
| 4,547,114 | 10/1985 | Watrous et al. .......................... | 198/625 |
| 4,550,655 | 11/1985 | Haas, Sr. et al. ........................ | 198/625 |
| 5,088,883 | 2/1992 | Focke et al. ........................... | 414/795.1 |
| 5,236,300 | 8/1993 | Aida et al. ............................. | 414/795.2 |
| 5,429,349 | 7/1995 | Supron et al. ......................... | 414/795.1 |

FOREIGN PATENT DOCUMENTS

| | | |
|---|---|---|
| 0403956 | 12/1990 | European Pat. Off. . |
| 0692442 | 1/1996 | European Pat. Off. . |
| 2123054 | 9/1972 | France . |
| 1127810 | 4/1992 | Germany . |

Primary Examiner—Karen M. Young
Assistant Examiner—Douglas Hess
Attorney, Agent, or Firm—Ladas & Parry

[57] ABSTRACT

A method and unit for forming stacks of articles, whereby the articles are conveyed on a conveying surface and in a first traveling direction to a pickup station, and are lifted successively in a second traveling direction, crosswise to the first direction, off the conveying surface at the pickup station and transferred on to a further surface, higher than the conveying surface, to form, on the higher surface, a stack presenting at least two superimposed, mutually contacting articles; the articles being conveyed and the stacks of articles being formed continuously and substantially seamlessly.

21 Claims, 5 Drawing Sheets

METHOD AND UNIT FOR FORMING STACKS OF ARTICLES

BACKGROUND OF THE INVENTION

The present invention relates to a method of forming stacks of articles.

From US-A-4,314,785 a method of forming stacks of articles is known comprising the steps of conveying the articles on a first conveying surface and in a first given traveling direction to a pickup station; successively lifting the articles, in a second traveling direction, off the first conveying surface at the pickup station, to transfer the articles on to a second surface higher than the first surface and so form, on the second surface, a stack of articles comprising at least two superimposed, mutually contacting articles; unloading said stack off said second surface; and further conveying said stack in an outlet traveling direction; said lifting step being performed by means of two counter-rotating screws having oppositely-inclined threads extending along respective helical paths substantially tangent to said first surface at said pickup station; the articles in said stack being guided vertically, during said lifting step, by guide means associated with each said screw; said step of conveying the articles on said first conveying surface and said step of lifting the articles being performed continuously and with substantially no interruption between said two steps.

According to the above known method, the stacks are unloaded off the second surface by means of an unloading pocket conveyor which must be operated in a stepped manner and in time with the operation of the screws. Since the time needed for forming each stack is a variable time owing to the articles being fed along the first surface in a generally discontinuous sequence (orderly sequence with some articles lacking along the sequence), the above unloading conveyor is a stepped conveyor with an uneven advancement frequence.

The above involves a major drawback owing to the fact that the above unloading pocket conveyor is the master conveyor for all the operations which are performed on the stacks after the above unloading step.

SUMMARY OF THE INVENTION

It is an object of the present invention to provide a method of forming stacks of articles, designed to overcome the aforementioned drawback.

According to the present invention, there is provided a method of forming stacks of articles, the method comprising the steps of conveying the articles on a first conveying surface and in a first given traveling direction to a pickup station; successively lifting the articles, in a second traveling direction, off the first conveying surface at the pickup station, to transfer the articles on to a second surface higher than the first surface and so form, on the second surface, a stack of articles comprising at least two superimposed, mutually contacting articles; unloading said stack off said second surface; and further conveying said stack in an outlet traveling direction; said lifting step being performed by means of two counter-rotating screws having oppositely-inclined threads extending along respective helical paths substantially tangent to said first surface at said pickup station; the articles in said stack being guided vertically, during said lifting step, by guide means associated with each said screw; said step of conveying the articles on said first conveying surface and said step of lifting the articles being performed continuously and with substantially no interruption between said two steps, and the method being characterized in that said guide means are movable guide means; said step of unloading the stack being performed by moving said movable guide means so as to feed the stack to an outlet conveyor performing said further conveying step.

Preferably, in the method set forth above, said unloading step is performed by moving each said movable guide means about an axis of the associated screw.

The present invention also relates to a unit for forming stacks of articles.

According to the present invention, there is provided a unit for forming stacks of articles, the unit comprising first conveying means for conveying the articles on a first conveying surface and in a first given traveling direction to a pickup station; lifting means for successively lifting the articles, in a second traveling direction, off the first conveying surface at the pickup station, to transfer the articles on to a second surface higher than the first surface and so form, on the second surface, a stack of articles comprising at least two superimposed, mutually contacting articles; said lifting means comprising two counter-rotating screws having oppositely-inclined threads extending along respective helical paths substantially tangent to said first surface at said pickup station; guide means associated with each said screw for guiding said articles in said second traveling direction; and second conveying means for further conveying said stack in an outlet traveling direction; said first conveying means and said lifting means being continuously-moving means, and the unit being characterized in that said guide means are movable to unload the stack from said lifting means and to feed the stack to the outlet conveyor.

According to a preferred embodiment of the unit set forth above, each said movable guide means is mounted for rotation about an axis of the associated screw.

BRIEF DESCRIPTION OF THE DRAWINGS

The invention will now be described by way of example with reference to the accompanying drawings, in which.

DETAILED DESCRIPTION OF THE INVENTION

Figure 1:
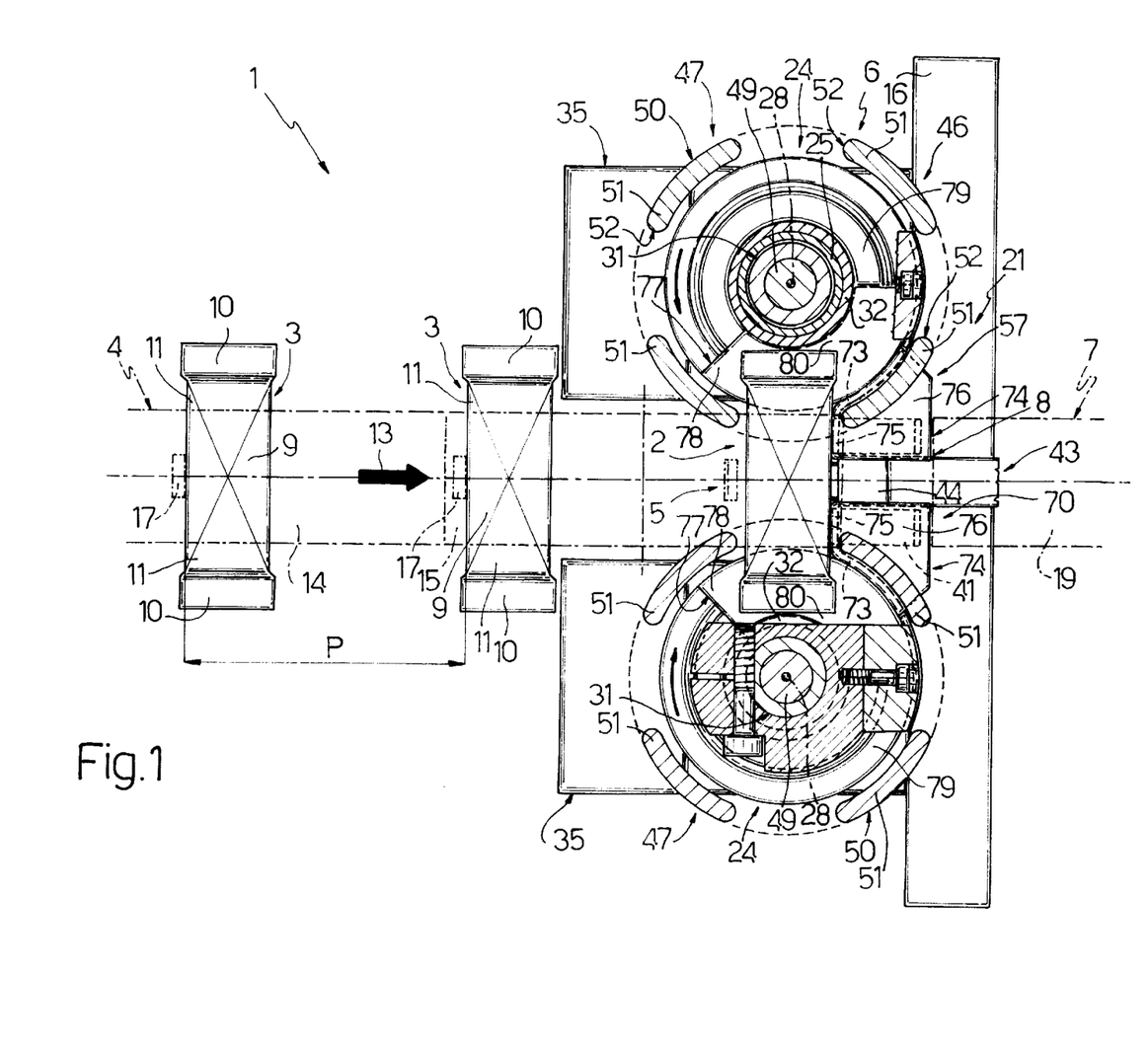
FIGS. 1 and 2 show plan views, with parts in section and parts removed for clarity, of two operating positions of a preferred embodiment of the unit according to the present invention.

Number 1 in FIG. 1 indicates a unit for forming stacks 2 of articles 3, and which comprises an input conveyor 4 for feeding articles 3 to a pickup station 5; a stacking assembly 6 located at station 5 and, as described in detail later on, for forming a stack 2 comprising at least two superimposed, mutually contacting articles 3; and an output conveyor 7 for receiving stack 2 from stacking assembly 6 at an unloading station 8. In the embodiment shown, each article 3 is defined by a so-called "pillow pack" wrapping presenting a substantially parallelepiped central body 9 with two flat lateral tabs 10 extending from respective end portions 11 of body 9.

Input conveyor 4 is a continuously-moving conveyor for feeding articles 3 on a conveying surface 12 and in a given traveling direction 13 to station 5, and comprises a conveyor belt 14 looped about two pulleys 15 (only one shown) defining, on belt 14, a conveying branch corresponding to surface 12.

More specifically, one of pulleys 15 if fitted in rotary manner, at station 5, to a base 16 forming part of stacking assembly 6, and belt 14 presents a number of external projections 17 spaced a given distance P apart and each cooperating with body 9 of a respective article 3 to feed article 3 along surface 12. In view of the location of pulley 15 described above, projections 17 are released from respective articles 3 as articles 3, in use, are fed to stacking assembly 6 at pickup station 5.

Output conveyor 7 is preferably, though not necessarily, a continuously-moving conveyor for conveying stacks 2 of articles 3 on a further conveying surface 18, which is parallel to and vertically offset in relation to surface 12, and extends in direction 13 from unloading station 8. More specifically, conveyor 7 comprises a conveyor belt 19 looped about two pulleys 20 defining, on belt 19, a conveying branch corresponding to surface 18, and of which only the pulley shown is fitted in rotary manner to base 16 at station 8.

As shown in FIGS. 1 to 4, stacking assembly 6 comprises a lifting device 21 for continuously and successively lifting articles 3 from station 5 in a further traveling direction 22 crosswise to direction 13, and for transferring each article 3 on to an upper stacking surface 23 located over station 5 and in a substantially intermediate position between surfaces 12 and 18, and so forming a stack 2 of articles 3 on surface 23.

Device 21 comprises two screws 24 counter-rotating at constant angular speed, located facing each other on either side of and substantially over pickup station 5, and comprising respective tubular central bodies 25, and respective oppositely-inclined threads 26 extending along respective helical paths 27 and cooperating with respective end portions 11 of each article 3 to feed article 3 in direction 22. In the embodiment shown, body 25 of each screw 24 presents a helical groove 25a extending along respective path 27 and which is engaged in sliding manner by a respective tab 10 of article 3.

Paths 27 extend from station 5 about respective axes 28 parallel to each other and to direction 22, are substantially tangent to surface 12 at station 5, and terminate at respective substantially horizontal end surfaces of respective screws 24 defining surface 23 and formed by sectioning each screw 24 crosswise to axis 28. Each path 27 comprises at least one bottom turn 29 presenting a given pitch P1, and at least one top turn 30 presenting a given pitch P2 smaller than pitch P1, and which, together with turn 29, provides for gradually eliminating a component of motion of articles 3 in direction 22 from station 5 to surface 18.

Device 21 also comprises, for each screw 24, a tubular supporting and propeller shaft 31; the top end portion 32 of shaft 31 extends, coaxially with respective axis 28, inside respective body 25 to support respective screw 24 by means of a known annular fastening element 33 located beneath screw 24; and the bottom end portion 34 of shaft 31 extends, coaxially with respective axis 28, inside a respective box supporting body 35 located beneath respective screw 24 and beneath surface 12 to support shaft 31 in rotary manner via the interposition of bearings 36. Body 35 is in turn supported in sliding manner on base 16 by means of a prismatic joint 37 for adjusting the distance between axes 28 as a function of the longitudinal size of articles 3 and by means of a known adjusting device (not shown) associated with joint 37 and for moving bodies 35 to and from each other in a direction perpendicular to axes 28.

Finally, device 21 comprises a right-angle gear transmission 38 housed inside bodies 35 and comprising, for each screw 24, a pair 39 of gears, one of which is located at the end of respective portion 34 of shaft 31; and a drive shaft 40 common to both pairs 39 and for rotating both screws 24 in opposite directions about respective axes 28 via the interposition of shafts 31 and transmission 38.

Stacking assembly 6 also comprises a fixed stop element 41 located between turns 29 at the end of surface 12 at station 5, and presenting a vertical front surface 41a facing conveyor 4, and a downward-facing bottom groove 42 crosswise to surface 41a; and a slowing device 43 located downstream from element 41 in direction 13, for gradually eliminating the component of motion of articles 3 in direction 13, and in turn comprising a stop element 44, which, by means of an actuator 45, is movable back and forth in nonlinear manner through groove 42 and between an extracted position (FIG. 5a) in which element 44 is located beyond surface 41a, outside groove 42 and adjacent to an article 3, and a withdrawn position (FIG. 5b) in which element 44 is located on the opposite side of surface 41a to conveyor 4 and inside groove 42.

Finally, stacking assembly 6 comprises a device 46 for guiding and unloading stack 2, and which is located over lifting device 21 to guide articles 3 in each stack 2 as articles 3 are stacked, in use, on surface 23, and to unload stack 2 off surface 23 feeding stack 2 itself to unloading station 8 on to conveying surface 18.

Device 46 comprises, for each screw 24, a cylindrical bell 47 comprising a horizontal top wall 48 fixed angularly to the top end of a shaft 49 extending, coaxially with respective axis 28, inside respective shaft 31, and a cylindrical lateral wall 50 extending downwards and coaxially with axis 28 from wall 48, and presenting at least two semicylindrical sectors 51 separated by respective longitudinal openings 52 and defined at the bottom by an annular bottom surface 53 of bell 47. In the example embodiment shown, wall 50 presents four sectors 51 and four openings 52.

Shaft 49 rotates about respective axis 28 and, at the bottom end projecting from respective shaft 31 inside respective body 35, presents a gear 54 forming part of a further right-angle gear transmission 55 housed inside bodies 35, beneath transmission 38, and comprising, in addition to gears 54, a pair of gears 55, each meshing with a respective gear 54, and a drive shaft 56 common to gears 55 and extending parallel to shaft 40 between the two bodies 35.

More specifically, each bell 47 is rotated by drive shaft 56 about respective axis 28 and between a stacking position (FIGS. 1 and 5a) in which an opening 52 of each bell 47 is positioned vertically over pickup station 5 to guide articles 3 in stack 2 by the two adjacent sectors 51 cooperating with end portions 11 of each article 3, and an unloading position (FIGS. 2 and 5c) in which openings 52 are oriented towards unloading station 8 to place stack 2 on conveying surface 18.

Finally, device 46 comprises, for each screw 24, a further lifting device 57 associated with respective bell 47 and for moving bell 47, parallel to respective axis 28, between a lowered guide position (FIG. 5a) corresponding to said stacking position and in which the annular bottom surface 53 of bell 47 is substantially coplanar with top surface 23 of respective screw 24, and a raised unloading position (FIG. 5 to 5d) corresponding to said unloading position and in which surface 53 is substantially coplanar with conveying surface 18.

More specifically, each device 57 comprises a tubular shaft 58 coaxial with respective axis 28, located in an intermediate position between respective shaft 49 and respective tubular shaft 31, and which is movable in direction 22 in relation to shaft 49 and, via the interposition of bearings 59, in relation to shaft 31. Each shaft 58 presents a top end portion 60 connected in rotary manner, via the interposition of a bearing 61, to a tubular element 62 extending downwards from top wall 48 of respective bell 47 to lift bell 47; and a bottom end portion 63 presenting two grooves 64 crosswise to and on either side of axis 28, and which is connected in angularly-rotating manner to respective gear 54 via the interposition of a bearing 65 defining a fixed bottom limit stop for shaft 58.

Each device 57 also comprises a control lever 66 housed inside respective box body 35, and which is fitted to a shaft 67 extending between bodies 35 and between and parallel to shafts 40 and 56, and presents, on the free end, a fork 68 supporting two rollers 69, which engage respective grooves 64 in portion 63 of shaft 58 in sliding manner, and prevent shaft 58 from rotating about axis 28.

Each device 57 also comprises an intermediate transfer element 70, which is fitted in angularly-fixed manner to portion 60 of shaft 58 via the interposition of an annular fastening element 71 connected to portion 60, and of a vertical bracket 72 located between elements 70 and 71, and is movable in direction 22 together with respective bell 47. More specifically, each element 70 comprises two integral substantially L-shaped plates 73 and 74; plate 73 extends along a curved plane between wall 50 of respective bell 47 and respective screw 24, and is connected to bracket 72; and plate 74 extends along a first plane 75 coplanar with surface 41a and connected to plate 73, and a second plane 76 parallel to surfaces 12 and 18 and extending crosswise to surface 75, towards conveyor 7 and beneath bottom annular surface 53 of respective bell 47.

As stated, each element 70 is movable in direction 22 together with respective bell 47, the rotation of which causes stack 2 to gradually engage surface 76 of element 70 and hence to be fed in direction 13 on surface 76. More specifically, in said lowered guide position, surface 76 is coplanar with top surface 23 of respective screw 24 awaiting stack 2, whereas, in said raised unloading position, surface 76 is coplanar with conveying surface 18 of conveyor 7 to enable stack 2 to be fed from surface 76 on to surface 18 at station 8.

Figures 5A, 5B, 5C, 5D:
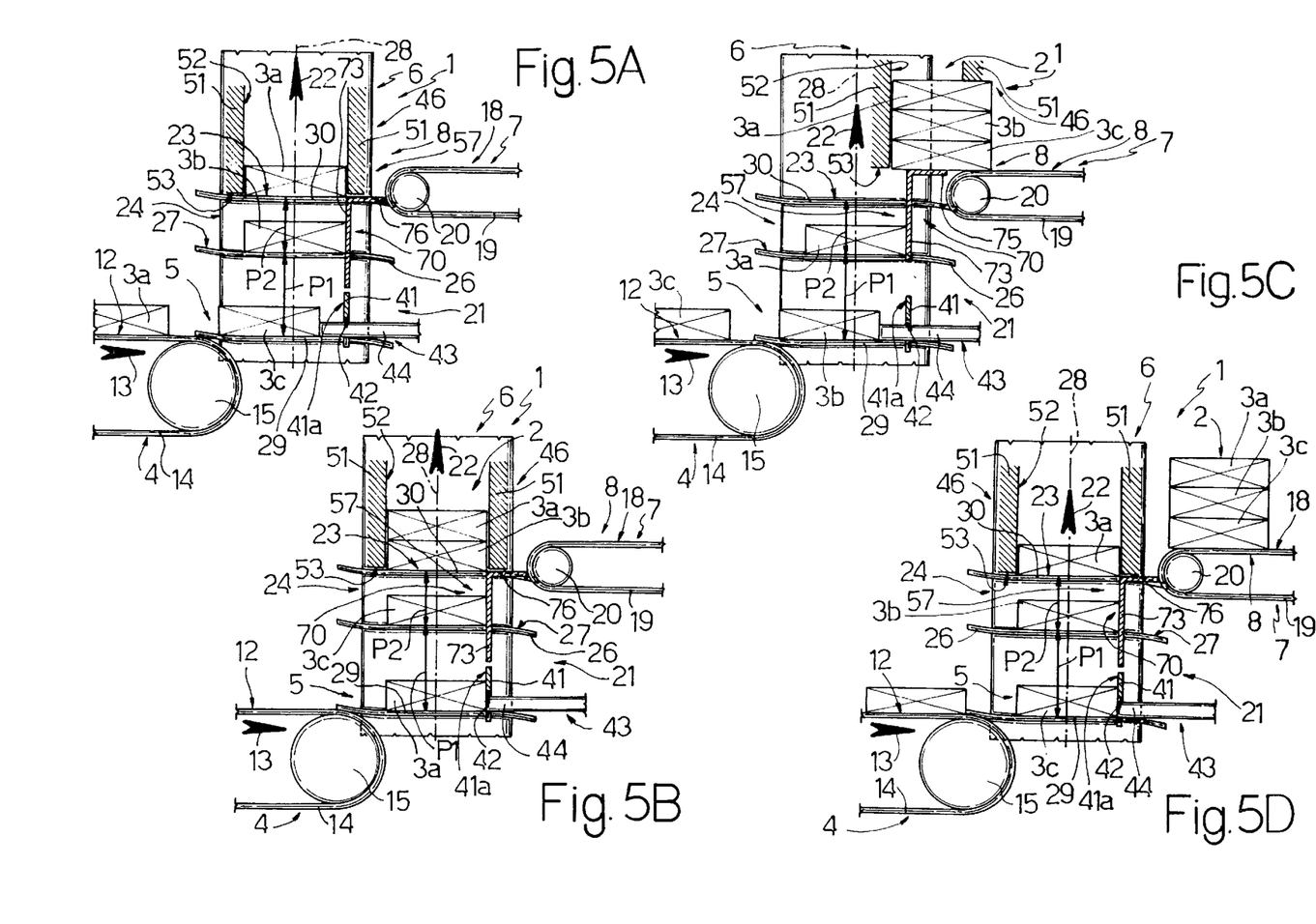
FIG. 5a to 5d shows, schematically, the FIG. 1 unit in four operating positions.

Operation of unit 1 for forming stacks 2 will now be described with reference to a stack 2 comprising three articles 3, indicated 3a, 3b, 3c, and as of the FIG. 5a operating position in which article 3a is located on surface 23; screws 24 are raising article 3b in direction 22 and eliminating the component of motion of article 3b in direction 22 by virtue of the gradual reduction in pitches P1 and P2 of respective turns 29 and 30; input conveyor 4 is supplying another article 3a on conveying surface 12, and has just fed article 3c to pickup station 5 so that respective projection 17 is already released, as stated, from article 3c, and article 3c is positioned partially contacting turns 29; and actuator 45 has set movable stop element 44 to the extracted position contacting article 3c.

As of the above operating condition, actuator 45 gradually moves element 44 from the extracted to the withdrawn position so as to eliminate the component of motion of article 3c in direction 13 and, hence, arrest article 3c in direction 13 as it comes into contact with fixed stop element 41 required to force article 3c on to threads 26 of screws 24.

Article 3c is therefore fed gradually on to turns 29 by element 44, and at the same time is raised in direction 22, which has the dual advantage of preventing article 3c from being damaged by severe impact against surface 41a of fixed stop element 41, and also of substantially seamlessly converting the straight horizontal forward motion of article 3c in direction 13 into a straight vertical upward motion of article 3c in direction 22.

At the same time, article 3b is raised in direction 22 and fed beneath article 3a located on surface 23 defined by said end surfaces of screws 24. More specifically, being formed by sectioning each screw 24 transversely to axis 28, said end surfaces of screws 24 are discontinuous and present respective openings 77 (FIGS. 1 and 2) defined by the end 78 of thread 26 and by a portion 79 of thread 26 extending beneath and to the side of end 78, and which divide each said end surface into a perfectly flat portion 80 crosswise to axis 28, and an inclined portion corresponding to portion 79.

Figure 2:
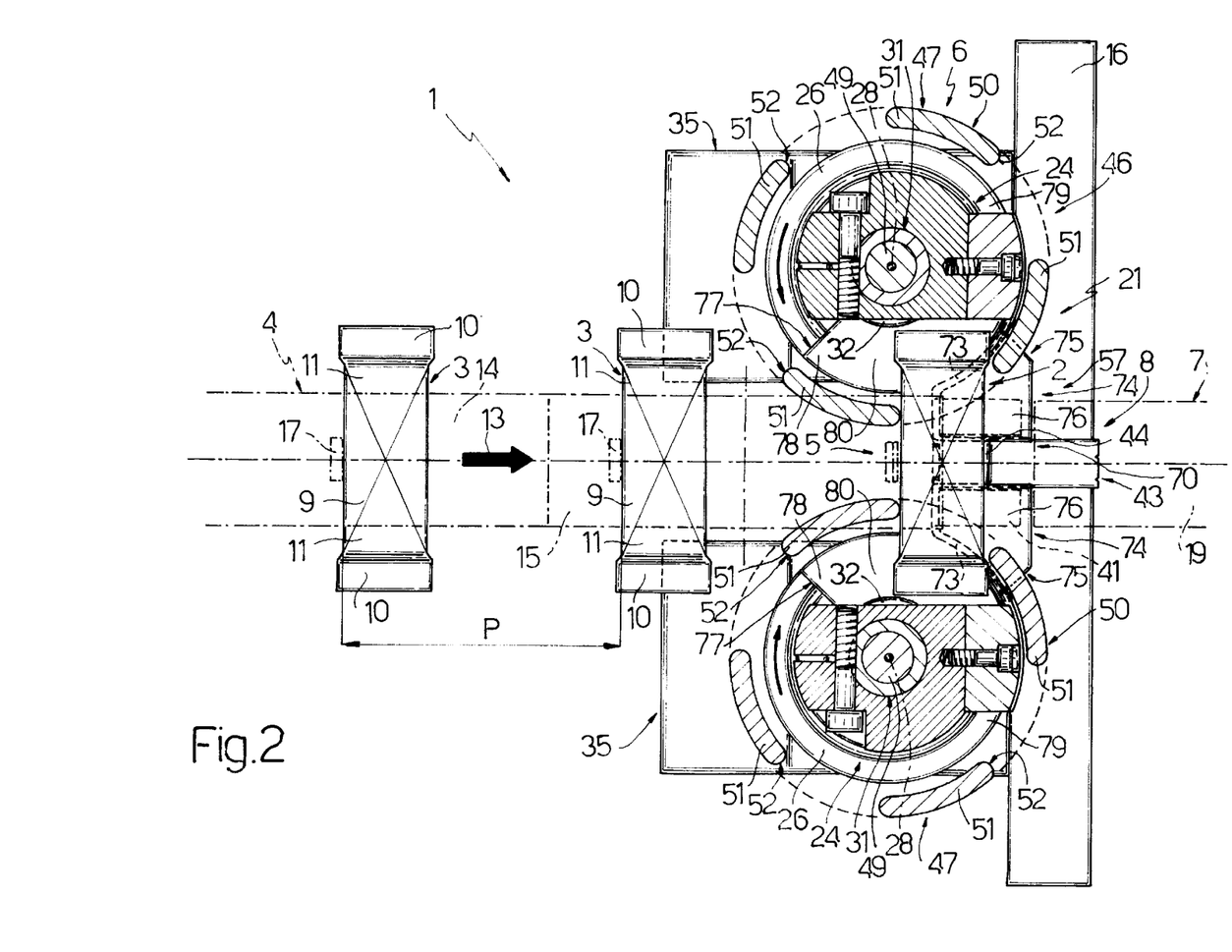

As screws 24 rotate about respective axes 28, each article 3 on surface 23 therefore bounces slightly as end portions 11 pass from portion 80 to portion 79, which bounce is eliminated, however, as end portions 11 of article 3b reach openings 77 and so act as a support for respective end portions 11 of article 3a.

Figure 3:
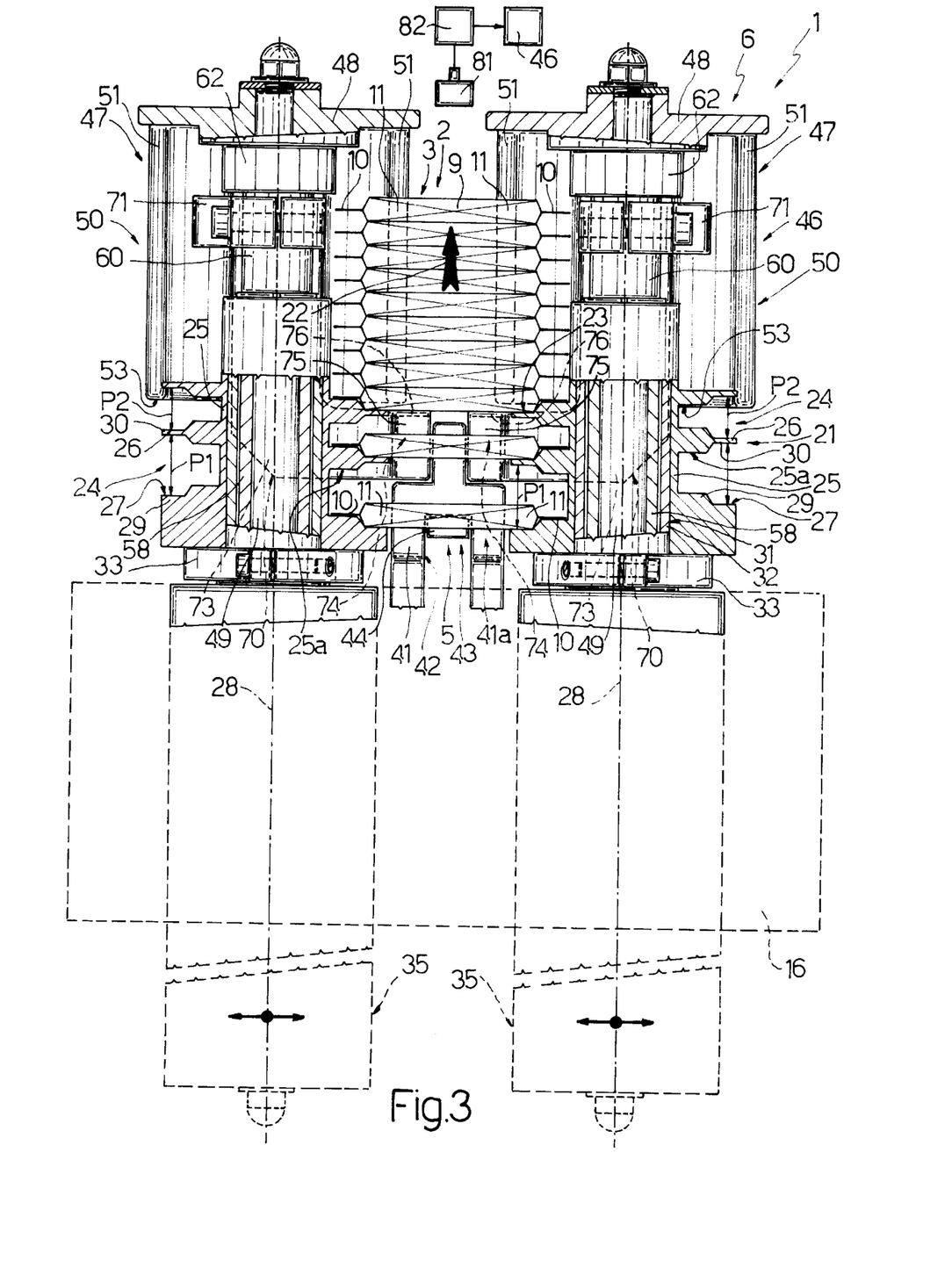
FIG. 3 shows a front view, with parts in section and parts removed for clarity, of the FIG. 1 unit.
Figure 4:
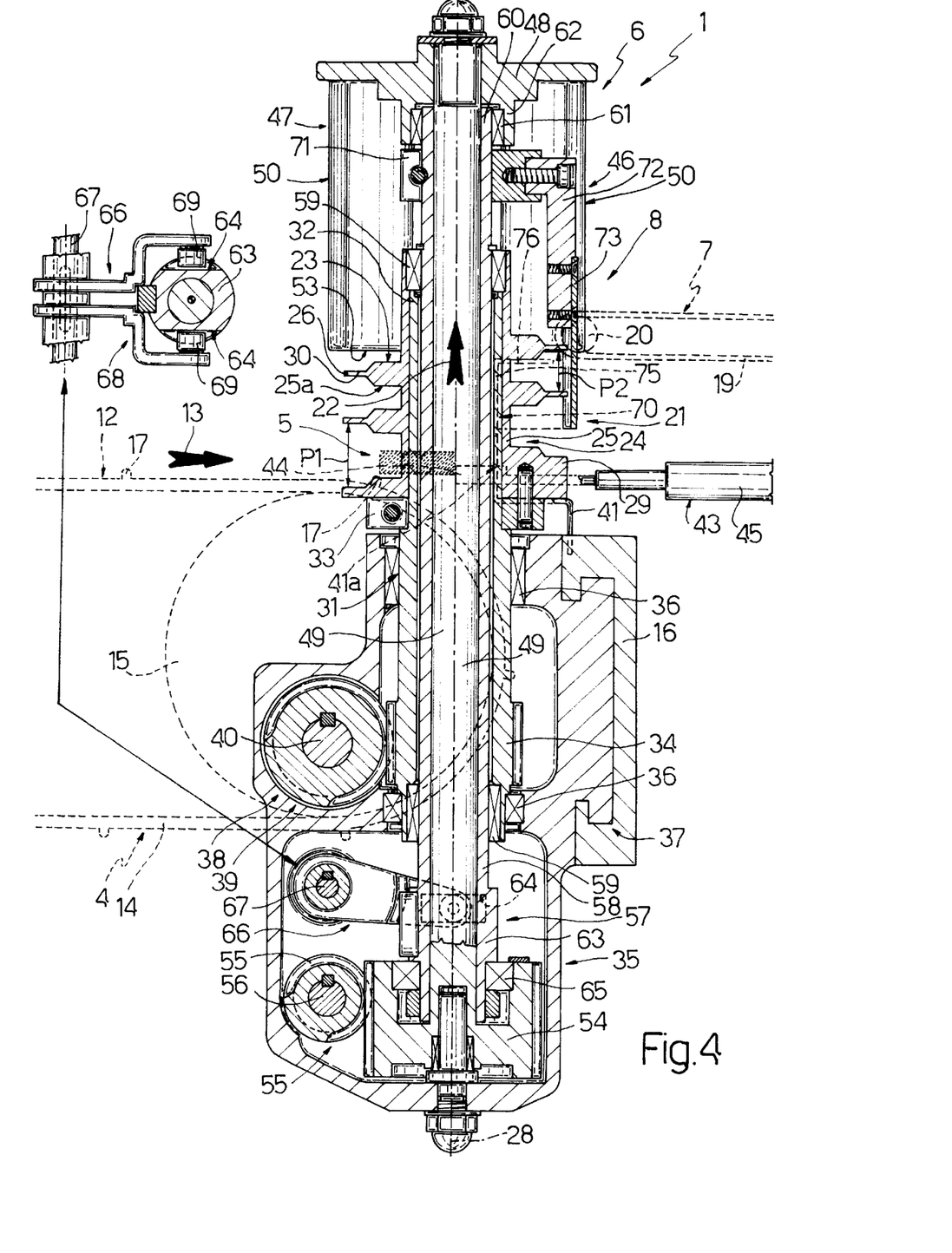
FIG. 4 shows a side view, with parts in section and parts removed for clarity, of the FIG. 1 unit.

The completion of stack 2 is detected by a control element shown schematically by 81 in FIG. 3, located between top walls 48 of bells 47, and connected to a control unit 82 in turn connected to guiding and unloading device 46, and which only activates device 46 when stack 2 is completed. More specifically, the continuous operation of conveyor 4 and stacking assembly 6, and the combination of screws 24 and sectors 51 for guiding articles 3 as they are being stacked, enable a gap of one or more articles 3 to be overcome by simply bouncing the articles 3 in stack 2 as described above.

When device 46 is activated, stack 2 is moved gradually in direction 13 from surface 23 to surface 76 of intermediate transfer element 70 by rotating bells 47 from the stacking to the unloading position, and is simultaneously raised on surface 76 from surface 23 to conveying surface 18 of output conveyor 7 by raising bells 47 from the lowered guide position to the raised unloading position.

When bells 47 are set to the unloading position, the newly formed stack 2 is transferred from surface 76 to surface 18 at unloading station 8 and then fed by conveyor 7 in direction 13, while the sectors 51 not formerly involved in the formation of stack 2 are positioned over station 5 to form the next stack 2. As stated, conveyor 7 is preferably, but not necessarily, a continuously-moving conveyor for conveying stacks 2 on surface 18, in which case, stacks 2 are spaced by a distance of n*P, where n is the number of articles 3 in each stack 2. If conveyor 7 is step-operated, stacks 2 are spaced by a distance equal to the spacing of conveyor 7, which, if stacks 2 are arranged contacting one another, corresponds to a spacing of n*P.

Unit 1 operates cyclically as described above, the various steps being performed substantially seamlessly one after the other to enable substantially continuous formation of stacks 2, and provides for stacking articles 3 of different sizes by simply varying the distance between axes 28 by means of said adjusting device. Moreover, when dealing with articles 3 (not shown) with no tabs 10, tubular bodies 25 of screws 24 need not necessarily present grooves 25a.

We claim:

1. A method of forming a stack (2) of articles (3), the method comprising the steps of: conveying articles (3) on a first conveying surface (12) and in a first traveling direction (13) to a pickup station (5);

successively lifting the articles (3) in a second traveling direction (22) by means of two counter-rotating screws (24) having oppositely-inclined threads (26) extending along respective helical paths (27) substantially tangent to the first surface (12) at the pickup station (5), the articles (3) being lifted off the first conveying surface (12) at the pickup station (5) and being transferred onto a second surface (23) higher than the first surface (12) to form on the second surface (23) a stack (2) of the articles (3) comprising at least two superimposed, mutually contacting ones of the articles (3);

guiding the articles (3) vertically during the lifting by guide means (46) respectively associated with the screws (24);

unloading the stack (2) off the second surface (23) by moving the guide means in relation to the helical paths (27); and conveying the stack (2) in an outlet traveling direction (13);

wherein the step of conveying the articles (3) on the first conveying surface (12) and the step of successively lifting the articles (3) are performed continuously and with substantially no interruption between these steps.

2. The method as claimed in claim 1, wherein the guide means (46) are mounted for rotation about axes (28) of the respective screws (24), and the moving of the guide means in the unloading step moves the guide means (46) about the axes (28) of the respective screws (24).

3. The method as claimed in claim 2, wherein the unloading step comprises feeding the stack (2) in the outlet traveling direction (13) onto an intermediate transfer element (70) associated with the guide means (46) of the respective screws (24) and lifting the stack (2) by means of the intermediate element (70) simultaneously with the step of conveying the stack.

4. The method as claimed in claim 1, wherein the outlet traveling direction (13) is parallel to the first traveling direction (13).

5. The method as claimed in claim 1, wherein the second surface (23) is an end surface of the screws (24).

6. The method as claimed in claim 1, further comprising, between the conveying and lifting steps, the steps of eliminating a first component of motion of each of the articles (3) in the first traveling direction (13), and of arresting each of the articles (3) in the first traveling direction (13), the eliminating step being progressive, and being performed at least partially during the successively lifting step.

7. The method as claimed in claim 6, wherein the successively lifting step comprises a step of eliminating a second component of motion of each of the articles (3) in the second traveling direction (22), the first (13) and second (22) traveling directions being crosswise to each other, and the second eliminating step being progressive and performed partially during the first eliminating step.

8. The method as claimed in claim 1, wherein, during the unloading step, the stack is placed on a third conveying surface (18) at an unloading station (8), the third conveying surface (18) being defined by the outlet conveyor (7), being parallel to the first surface (12), and being offset vertically in relation to the first surface (12) and in relation to the second surface (23).

9. The method as claimed in claim 1, wherein the unloading step is performed substantially following completion of the stack (2) of the articles (3).

10. A unit for forming a stack (2) of articles (3), the unit comprising:

first conveying means (4) for conveying articles (3) on a first conveying surface (12) and in a first traveling direction (13) to a pickup station (5);

lifting means (24) for successively lifting the articles (3) in a second traveling direction (22) off the first conveying surface (12) at the pickup station (5) to transfer the articles (3) onto a second surface (23) higher than the first surface (12) and so form on the second surface (23) a stack (2) of the articles (3) comprising at least two superimposed, mutually contacting ones of the articles (3), the lifting means (24) comprising two counter-rotating screws (24) having oppositely-inclined threads (26) extending along respective helical paths (27) substantially tangent to the first surface (12) at the pickup station (5);

second conveying means (7) comprising an outlet conveyor (7) for conveying the stack (2) in an outlet traveling direction (13); and movable guide and unloading means (46) respectively associated with the screws (24) for guiding the articles (3) in the second traveling direction (22), unloading the stack (2) from the lifting means, and feeding the stack (2) to the outlet conveyor (7), wherein the first conveying means (4) and the lifting means (24) are continuously moving.

11. The unit as claimed in claim 10, wherein the movable guide and unloading means (46) are mounted for rotation about axes (28) of the respective screws (24).

12. The unit as claimed in claim 11, further comprising:

intermediate transfer elements (70) respectively associated with the guide and unloading means (46) of the screws (24), the intermediate elements (70) being movable in the second traveling direction (22) between the second surface (23) and a third surface (18) at an unloading station (8), the third surface (18) being defined by the outlet conveyor (7), being parallel to the first surface (12), and being offset vertically in relation to the first surface (12) and in relation to said second surface (23) and the guide means being operable to feed the stack (2) in the outlet travelling direction (13) onto the intermediate element (70) and thereafter onto the third surface (18).

13. The unit as claimed in claim 12, wherein the guide means (46) comprise:

tubular elements (47) respectively for the screws (24), mounted for rotation about the respective axes (28) and each having at least a pair of substantially semicylindrical sectors (51) defining respective longitudinal openings (52); and first actuating means (56) for rotating the tubular elements (47) between a stacking position wherein the openings (52) of the tubular elements (47) are located vertically over the pickup station (5) to receive the stack (2), and an unloading position wherein the openings (52) are oriented towards the unloading station (8) to feed the stack (2) onto the third conveying surface (18).

14. The unit as claimed in claim 13, further comprising respectively for the tubular elements (47) second actuating means (57) for moving the tubular elements (47) in said second direction (22) between a lowered position for guiding the articles (3) in said stack (2) and a raised position for unloading the stack (2) the lowered position corresponding to said stacking position and the raised position corresponding to said unloading position.

15. The unit as claimed in claim 10, wherein the outlet traveling direction (13) is parallel to the first traveling direction (13).

16. The unit as claimed claim 10, wherein the second surface (23) is end surfaces of the screws (24).

17. The unit as claimed in claim 10, further comprising:

slowing means (43) for eliminating a component of motion of each of the articles (3) in the first traveling direction (13); and arresting means (41) for arresting each of the articles (3) in the first traveling direction (13).

18. The unit as claimed in claim 17, wherein the slowing means (43) comprise movable stop means (44) for stopping the articles (3) in the first traveling direction, and actuating means (45) for moving the stop means (44) in the first traveling direction progressively and at least partially during the successively lifting of the lifting means (24).

19. The unit as claimed in claim 18, wherein the axes (28) are parallel to the second traveling direction (22), and said screws (24) each comprise at least a first and second turn (29, 30) having respective pitches (P1, P2) decreasing in the second traveling direction (22), the first (13) and second (22) traveling directions being crosswise to each other.

20. A method of forming a stack (2) of articles (3), the method comprising the steps of:

conveying articles (3) on a first conveying surface (12) and in a first traveling direction (13) to a pickup station (5);

successively lifting the articles (3) in a second traveling direction (22) off the first conveying surface (12) at the pickup station (5) to transfer the articles (3) onto a second surface (23) higher than the first surface (12) and so form, on the second surface (23), a stack (2) of articles (3) comprising at least two superimposed, mutually contacting ones of the articles (3);

unloading the stack (2) off the second surface (23); and conveying the stack (2) in an outlet traveling direction (13), wherein:

the lifting step is performed by means of two counter-rotating screws (24) having oppositely-inclined threads (26) extending along respective helical paths (27) substantially tangent to the first surface (12) at the pickup station (5);

the articles (3) in the stack (2) are guided vertically during the lifting step by movable guide means (46) respectively associated with the screws (24);

the step of conveying the articles (3) on the first conveying surface (12) and the step of lifting the articles (3) are performed continuously and with substantially no interruption; and the step of unloading the stack (2) is performed by rotating the movable guide means (46) respectively about axes (28) of the screws (24) so as to feed the stack to an outlet conveyor (7).

21. A unit for forming a stack (2) of articles (3), the unit comprising:

first conveying means (4) for conveying the articles (3) on a first conveying surface (12) and in a first traveling direction (13) to a pickup station (5);

lifting means (24) for successively lifting the articles (3) in a second traveling direction (22) off the first conveying surface (12) at the pickup station (4) to transfer the articles (3) onto a second surface (23) higher than the first surface (12) and so form on the second surface (23) a stack (2) of articles (3) comprising at least two superimposed, mutually contacting ones of the articles (3), the lifting means (24) comprising two counter-rotating screws (24) having oppositely-inclined threads (26) extending along respective helical paths (27) substantially tangent to the first surface (12) at the pickup station (5);

movable guide means (46) respectively associated with the screws (24) for guiding the articles (3) in the second traveling direction (22); and second conveying means (7) comprising an outlet conveyor (7) for conveying the stack (2) in an outlet traveling direction (13), wherein:

the first conveying means (4) and the lifting means (24) are continuously moving; and the guide means (46) are respectively mounted for rotation about axes (28) of the screws (24) to unload the stack (2) from the lifting means and to feed the stack (2) to the outlet conveyor (7).

* * * * *